United States Patent [19]

George et al.

[11] Patent Number: 4,738,876

[45] Date of Patent: Apr. 19, 1988

[54] STONE SURFACE TREATING METHODS AND COMPOSITIONS

[75] Inventors: Roger D. George, Farnborough, United Kingdom; Sampath R. Pasupathikoil, Racine County, Wis.; Nigel Stansfeld, Aldershot, United Kingdom

[73] Assignee: S. C. Johnson & Son, Inc., Racine, Wis.

[21] Appl. No.: 941,139

[22] Filed: Dec. 12, 1986

Related U.S. Application Data

[63] Continuation of Ser. No. 741,653, Jun. 5, 1985, abandoned.

[51] Int. Cl.$^4$ ............... B05D 3/12; C09K 13/06
[52] U.S. Cl. ...................... 427/299; 134/2; 134/27; 134/28; 134/34; 252/79.4; 252/88; 252/100; 252/104; 252/143; 252/145; 252/162; 252/163; 252/164; 252/167; 252/168; 252/170; 427/399; 427/337
[58] Field of Search ............ 427/337, 299, 399; 252/88, 100, 104, 143, 145, 162, 163, 164, 170, 167, 168, 79.4; 134/27, 28, 2, 34

[56] References Cited

U.S. PATENT DOCUMENTS

| | | | |
|---|---|---|---|
| 90,754 | 6/1869 | Ivers et al. | 252/144 |
| 133,095 | 1/1872 | Hagget et al. | 252/142 |
| 145,971 | 12/1873 | Sawyer | 134/27 |
| 181,790 | 9/1876 | Love | 134/27 |
| 370,551 | 9/1887 | McCarty | 134/3 |
| 542,524 | 7/1895 | Hutchinson | 252/143 |
| 1,574,406 | 6/1923 | Nelson | 252/142 |
| 2,657,154 | 10/1953 | Brouwer | 427/399 |
| 3,234,137 | 2/1966 | Lemgire | 252/79.4 |
| 3,635,826 | 1/1972 | Hamilton | 252/79.4 |
| 4,186,031 | 1/1980 | Armstrong | 134/1 |
| 4,297,148 | 10/1981 | Zervopoulos | 134/3 |
| 4,469,525 | 9/1984 | Dodge | 134/3 |
| 4,472,205 | 9/1984 | Cortner | 134/27 |

*Primary Examiner*—Janyce A. Bell

[57] ABSTRACT

A process for treating a stone surface is disclosed. Stone floor surfaces, such as, marble and terrazzo, are treated with an acid conditioner followed by buffing with a crystallizing agent whereby a durable, high gloss finish is produced in situ on the floor surface.

35 Claims, No Drawings

STONE SURFACE TREATING METHODS AND COMPOSITIONS

REFERENCE TO RELATED APPLICATION

This application is a continuation of patent application Ser. No. 741,653, filed June 5, 1985 now abandoned, the benefit of which is now claimed for purposes of priortiy pursuant to 35 U.S.C. §120.

BACKGROUND OF THE INVENTION

The present invention relates to a method of treating a stone surface to produce a durable, high gloss finish thereon. In particular, an acid conditioner is applied to the stone surface followed by application, by buffing, of a crystallizing agent. Additionally, the present invention relates to novel acid conditioning compositions employed in the present process and to an improved crystallizing agent. The present process and compositions are particularly useful for treating stone floors.

Stone floors, and in particular marble and terrazzo, are luxurious, long lasting and capable of withstanding heavy traffic with a relatively minimal amount of maintenance. However, floor finishes for stone floors are lacking both in appearance and durability. Traditionally, wax-based, high gloss floor finishes do not adhere well to the stone floor surface and the organic film actually detracts from the naturally high gloss of a highly crystallized marble or terrazzo floor.

Recently, microcrystal finishes have been applied to stone floors by application of a crystallizing agent, such as $MgSiF_6$, whereby $CaF_2$ and $MgF_2$ crystals are formed on the floor surface. These crystals protect the floor and provide an acceptable gloss finish. While crystallization finishes are aesthetically acceptable, they are very labor intensive and time consuming leading to exhorbitant costs.

The present invention provides a novel process for treating stone floor surfaces employing a novel acid conditioning composition and an improved crystallizing agent. The process is efficient.

SUMMARY OF THE INVENTION

Briefly, in accordance with the present invention, stone surfaces are treated (a) by applying an acid conditioning composition to the stone surface, (b) allowing the acid conditioning composition to dry on the stone surface, and, thereafter (c) applying, by buffing, a crystallizing agent over the acid conditioner.

The result is the formation of a durable, high uniform gloss surface on the stone.

Of particular interest in the practice of the present invention is a process for treating or finishing marble and terrazzo floors by using an acid conditioning composition containing oxalic acid and stannic chloride, a zinc hexafluorosilicate containing crystallizing agent and a rotary buffing machine to apply the acid conditioning composition and the crystallizing agent.

DETAILED DESCRIPTION OF THE INVENTION

In practicing the present invention, it is essential to employ an acid conditioning composition and a crystallizing agent. The acid conditioning composition is applied to stone surface (preferably a stone floor surface), allowed to dry, and thereafter, the crystallizing agent is applied over the acid conditioner. The acid conditioning composition improves the action of the crystallizing agent when applied over the acid conditioner and results in the formation of a durable, high, uniform gloss surface on the treated stone (floor). Suitable stone surfaces include floors, shelves, countertops and wall surfaces. For convenience, any reference to floor treating processes and compositions useful for floor treatment shall be equally applicable to other stone surfaces.

Stone surfaces suitable for treatment by the present process include, but are not limited to, marble, terrazzo, synthetic terrazzo and marble, magnesite, concrete, hydraulic mosaics, granite, quarry tile and any other polished stone employed to make floor surfaces. Preferred stone floor surfaces for treatment under the present process include marble and terrazzo floors. The present process is carried out on existing floor, shelving, countertop or wall surfaces. Alternatively, the present process can be carried out on stone tiles, bricks, slabs, etc. by a stone manufacturer prior to the making of the floor, shelf, countertop or wall.

The acid conditioning compositions, also referred to as acid conditioning agents or primers, according to the present invention, comprise an acid, a surfactant, an organic solvent in an amount effective to increase the evaporation rate of the acid conditioning agent, and water. The acid conditioning agent must have a pH of from about 0.1 to 2.0, advantageously from about 0.5 to 1.0, and preferably about 0.7. A pH below about 0.1 is undesirable because severe pitting of the floor will occur and a pH above about 2.0 will not improve the action of the crystallizing agent when applied over the acid conditioning agent.

Suitable acids for use in the acid conditioning composition include oxalic acid, citric acid, tartaric acid, hydrochloric acid, and other mineral acids. Mixtures of acids can also be employed. The acids are present in the acid conditioning composition in an amount effective to impart the proper pH to the acid conditioning agent, i.e., pH of from about 0.1 to about 2.0. A preferred acid for use in the practice of the present invention is oxalic acid and should be present in the acid conditioning composition in the range of from about 5 to about 25% by weight and preferably from about 10 to about 20% by weight. Concentrations of oxalic acid greater than about 25% may cause pad clogging problems when the acid conditioning agent is applied with a rotary floor buffing machine.

Surfactants are employed in the present acid conditioning compositions to insure good wetting of the treated floor surface by the acid conditioning composition. The exact nature of the surfactant is not critical to the practice of the present invention and any compatible, acid-stable detergent/wetting agent is suitable. Suitable surfactants include: (a) nonionic surfactants, such as, for example, block polymers including polyoxypropylene/polyoxyethylene condensates (SUPRONIC E100 block polymer having an average m.w. of 2,000) and ethyoxylated alkyl phenols and alkoxylated linear alcohols including the following commercially available products sold under the following trademarks: BEROL 09 (nonyl phenol with 9–10 moles ethylene oxide), TERGITOL 15-S-9, TERGITOL 15-S-12, TERGITOL 15-S-15, TRITON X-100, TRITON X-165, TRITON X-405, SURFONIC N-100, SURFONIC N-102, and various PLURAFAC and PLURONIC brand surfactants; (b) anionic surfactants, such as, for example alkyl aryl sulfonic acids including dodecyl benzene sulfonic acids sold under the following trademarks: CONOCO C-550 and NANSA SSA; (c) cationic surfactants, such as, for example, amine ethoxylates (ETHOMEEN C/15, a coconut amine with 5 moles of ethylene oxide), tallow dimethyl benzyl ammonium chloride (AMMONYX 856) and cetyl dimethyl benzyl ammonium chloride (AMMONYX T); and (d) amphoteric surfactants, such as, for example, coco amido betaine (LONZAINE-C, LONZAINE CO) and coco betaine (LONZAINE 12C). Mixtures of surfactants can also be employed.

Preferred surfactants include alkoxylated linear alcohols such as the commercially available product TERGITOL 15-S-12 brand secondary $C_{11}-C_{15}$ alcohol with 12 moles of ethylene oxide.

An organic solvent is empolyed in the present acid conditioning composition in an amount effective to increase the evaporation rate of the acid conditioning composition when applied to stone floor surfaces. Prolonged exposure of wet acid conditioner may cause pitting of the floor surface. When oxalic acid is employed as the acid component, an organic solvent such as industrial methylated spirits aids the solubility of the oxalic acid in the acid conditioning composition. Suitable organic solvents include methanol, ethanol, and industrial methylated spirits which is ethanol denatured with methanol. Mixtures of organic solvents can also be employed. The organic solvents are usually present in the acid conditioning composition in an amount of from about 10 to about 40% by weight. When oxalic acid is employed as the acid component of the acid conditioning composition concentrations of methanol, ethanol or industrial methylated spirits below about 10% will cause the oxalic acid to crystallize out of solution and concentrations of these solvents above about 40% cause the acid conditioning composition to dry out too rapidly, especially under a high speed buffing machine so that insufficient contact with the stone floor surface results.

Water comprises the balance of the acid conditioning composition and is employed to provide a stable formulation wherein the ingredients are mutually soluble or dispersible. Water is present in the acid conditioning composition in amounts of from 35 to about 85% by weight, advantageously from about 40 to about 60% by weight, and preferably from about 45 to about 55% by weight.

Additionally, the acid conditioning compositions of the present invention may contain other active ingredients commonly employed in stone floor treating finishes. These other ingredients include color enhancers, hardeners, waxes, and dust absorbing agents. Usually the acid conditioning composition is a solution, but in some cases may be a suspension or dispersion depending upon the individual ingredients and their concentration. When waxes are present in the acid conditioners, the acid conditioner will usually appear milky white. If separation occurs, shaking will redisperse the ingredients.

Suitable color enhancer/hardeners include metal chlorides, oxychlorides and oxides such as $ZnCl_2$, $MgCl_2$, $MgOCl_2$, tin chloride compounds and tin oxides, including stannic chloride, tin (IV) chloride pentahydrate and stannic oxide. Stannic chloride is a preferred color enhancer/hardener and is usually employed in the acid conditioning composition in amounts of from about 2 to about 10%, advantageously from about 4 to about 7% and preferably about 5% by weight. While concentrations of stannic chloride above about 6 or 7% can be employed, irritating fumes are often liberated which presents a nuisance to the operator when applying the finish to the floor.

Suitable waxes include dispersed polyethylene waxes and emulsified polyethylene waxes. Any wax employed should have good electrolyte stability and should be stable in the pH range of the acid conditioning composition. Waxes are generally present in the acid conditioning composition of the present invention in amounts ranging from about 0.1 to about 10% and advantageously from about 0.3 to about 2.5% by weight. When the acid conditioning composition is applied with a buffing machine, greater than about 2.5% by weight wax in the acid conditioning composition may result in clogging of the buffing pads. Therefore, when applying the acid conditioning composition with a rotary floor buffing machine, waxes should be limited to about 2.5% by weight or less. Preferred waxes include the dispersed polyethylene waxes and, in particular, LICOMER VP PE 02, which is a dispersed polyethylene wax of molecular weight range 16,000 to 20,000 commercially available from Hoechst.

Dust absorbing agents are advantageously employed in the acid conditioning composition to control dust which forms when the floor is buffed. Excessive dust buildup may result in a patchy final gloss on the finished floor surface. Suitable dust absorbing agents include the glycol ethers. Advantageously, the glycol ethers will be sufficiently volatile to have no adverse effect on the drying rate of the acid conditioning composition when such composition is applied to the floor by mopping, yet the glycol ethers must not be volatile that they flash off when applied to the floor with a high speed rotary buffing machine. The glycol ethers can be mono- or diglycol ethers and include ethylene, propylene, and butylene glycol, and their methyl, ethyl, and propyl ethers. A particularly preferred glycol ether is dipropylene glycol monomethyl ether commercially available from the Dow Chemical Company as DOWANOL DPM. Additionally, glycol ether acetates could also be used as dust absorbing agents.

The glycol ether dust absorbing agents are added to the present acid conditioning compositions in amounts up to about 30% by weight, advantageously from about 5 to about 20% by weight, and preferably about 7% by weight. At concentrations over 30% by weight, the high boiling point glycol ethers can significantly slow down the drying rate of the acid conditioning composition especially when the acid conditioning composition is applied to the floor with a mop; and low boiling point glycol ethers can cause the acid conditioning composition to dry out too rapidly when the acid conditioning composition is applied with a high speed rotary buffing machine.

The acid conditioning compositions are prepared employing standard mixing and blending techniques that are well-known to one skilled in the art. Advantageously, the solid ingredients are added to water, with agitation, followed by the addition of the liquid ingredients thereto, also with agitation. In a preferred embodiment, an organic acid is dissolved in water and a mixture of organic solvent, glycol ether and tin chloride is added thereto with agitation. A surfactant is then added to complete the formulation.

The crystallizing agent employed in the practice of the present invention can be any of the commercially available crystallizing agents such as, for example, TERRANOVA crystalizer formulation manufactured by S. C. Johnson & Son, Inc.; TERRAZZO TREAT Floor Treatment, available from Balmforth Cleaning Services in the United Kingdom; KLEEVER crystallization products and COOR crystallization products. These commercially available crystallizing agents all contain magnesium hexafluorosilicate ($MgSiF_6$) as the active crystallizing agent. However, any hexafluorosilicate salt can be used as the crystallizing agent.

It has been unexpectedly found that the zinc hexafluorosilicate salt is a superior crystallizing agent compared to other hexafluorosilicate salts. The zinc hexafluorosilicate salt, when used as the crystallizing agent, provides a finished floor having a more durable finish. Therefore, the present invention encompasses (1) the use of zinc hexafluorosilicate as an improved crystallizing agent and, (2) crystallizing compositions containing zinc hexafluorosilicate.

The improved crystallizing composition of the present invention comprises zinc hexafluorosilicate, an acid-stable thickening agent and water. The crystallizing composition should have a pH in the range of from about 1 to about 5. Additionally, other standard additives can be added to the crystallizing formulation. Such additives include, but are not limited to, a source of free fluoride ions which promote and accelerate the fluorination of the stone surface (ammonium bifluoride); a gloss enhancer (magnesium citrate dibasic, calcium citrate); an acid to adjust the pH of the formulation (oxalic acid); a wax to act as a surface lubricant and to aid in high speed buffing (polyethylene wax dispersion); an organic solvent to aid in the solubilization of other ingredients (ethanol, methanol and industrial methylated spirits); a surfactant to aid in wetting the floor (ethoxylated linear alcohols); up to 5% stannic chloride; and a dust controlling agent (glycol ethers).

Typical improved crystallizing formulations would contain the following ingredients:

|  | Weight % |
| --- | --- |
| Zinc Hexafluorosilicate | 2-20 |
| Ammonium Bifluoride | 0-10 |
| Mg Citrate Dibasic | 0-10 |
| Oxalic Acid | 0-5 |
| Polyethylene Wax Dispersion (40%) | 0-10 |
| Thickening Agent | 0.01-5 |
| Organic Solvent | 0-30 |
| Surfactant | 0.01-2 |
| Stannic Chloride | 0-5 |
| Dust Absorbant | 0-10 |
| Water (qs 100%) | Balance |

Stone floor surfaces are treated according to the present invention by (1) applying an acid conditioning composition disclosed herein to the floor surface, (2) allowing the acid conditioning composition to dry on the floor surface and, (3) thereafter applying, by buffing, over the acid conditioning composition an effective amount of a crystallizing agent. A durable, high, uniform gloss is produced in situ on the floor surface.

The acid conditioning composition (hereinafter referred to as "primer") is applied to the stone floor surface employing conventional techniques, such as, for example, pouring or spraying the primer onto the floor and wetting the floor surface with a mop, or pouring or spraying the primer onto the floor and wetting with a rotary floor buffing machine. Additionally, the primer can be center fed into the middle of the buffing pad when the primer is applied with a rotary buffing machine. When center feeding the primer, a dispenser with a substantially dripless value should be employed to prevent the primer from dripping unnecessarily onto undesirable areas. It is preferred to apply the primer employing a rotary buffing machine, which will be referred to as "dripriming".

In a preferred embodiment of the present invention, the stone floor surface is wetted with the primer by buffing the primer into the stone floor surface (driprimed) with a high speed (150–600 rpm) rotary floor buffing machine until dry. The exact machine, pad, and rotary buffing speed are not critical to the practice of the present invention, but it has been found that a heavier machine results in a higher gloss on the finished floor after the crystallizing agent is applied. A heavier machine can weigh from about 40 to about 70 kilograms and can be fitted with a buffing pad having a diameter of from about 15 to about 20 inches. Also, the heavier machines improve the efficiency of the primer in cleaning the floor. When the primer is applied to the floor with a buffing machine, a stripping grade pad is employed on the machine.

The primer is applied to clean or dirty bare floors or to floors having a light to medium polish buildup. The floors may be clean or dirty. Floors which have a heavy polish buildup, which have a coat of sealer, or which are heavily scratched, require preparation by conventional stripping methods or by sanding with a carborundum disk. After the stripping operation, the floor is treated with a primer as described above. It is not necessary to apply the primer to floors which have previously been crystallized with the exception that crystallized floors subjected to extremely heavy traffic should be primed and re-crystallized in order to produce a uniform finish.

After the primer is applied to the floor, the primer is allowed to dry. When the primer is applied with a mop, the floor usually dries in from about 10 to about 20 minutes. When a buffing machine is used to apply the primer, the floor is usually dry immediately.

Shortly after the primer has dried on the floor, the crystallizing agent should be applied. Prolonged exposure of wet primer on the floor may cause pitting to the floor surface. Therefore, it is preferred that the primer be applied to the floor with a buffing machine. Primer applied with a mop should contain enough organic solvent so that the primer evaporates within about 30 minutes after application.

Once the primer has dried on the floor surface, a crystallizing agent is applied by buffing with a high speed (150–600 rpm) rotary floor buffing machine. A heavy buffing machine is preferred as it usually results in a higher gloss finish on the floor surface. The crystallizing agent is applied to the floor employing a buffing pad on the machine. A wire wool (steel wool) pad is preferred. After the crystallizing agent has been buffed into the floor, the floor can then be dry buffed with a synthetic buffing grade pad to produce a high gloss. A vacuum attachment can be added to the buffing machine to collect any excess dust that may accumulate during the dry buffing operation.

The exact application rate, in volume per area, of the primer and crystallizing agent will vary depending on a variety of factors, such as floor condition, the exact composition of the primer, the crystallizing agent and the particular method of application. The optimum application rate in a given situation is readily determined by one skilled in the art.

When the primer is applied to the floor surface with a mop, it is usually applied at a rate of from about 15–60 ml/m$^2$ and preferably from about 20–40 ml/m$^2$. When the primer is applied with a buffing machine, it is applied at a rate of from about 10–40 ml/m$^2$ and preferably at a rate of from about 15–20 ml/m$^2$. The crystallizer agents are usually applied at rates of from about 5–30 ml/m$^2$ and preferably at a rate of from about 10–15 ml/m$^2$.

For vertical border surfaces and surfaces too small to receive a buffing machine, the primer can be applied by hand, allowed to dry, and the crystallizing agent followed also by hand application. Hand application can be achieved with either a synthetic pad or a hand sanding (orbital) machine. Alternatively, border and trim areas too small to receive a buffing machine can be cleaned and polished with standard marble/terrazzo cleaners and polishes.

Floors and other stone surfaces treated according to the present invention possess a durable, high uniform gloss. Maintenance of the treated floors and surfaces is achieved by periodic, i.e., weekly, biweekly, monthly, etc., application by buffing, of a crystallizing agent to the treated floor or stone surface. However, treated floors exposed to extremely heavy traffic and which appear severely scratched and worn, should be stripped, primed and crystallized employing the procedures described herein to produce a uniform finish on such heavily trafficked floors.

The following examples illustrate the practice of the present invention but should not be construed as limiting its scope.

EXAMPLE 1

The following ingredients were blended to make acid conditioner formulations useful in the practice of the present invention. The solid ingredients were added to water, with agitation, followed by addition of the liquid ingredients.

| INGREDIENTS | AMOUNT (% W/W) |
|---|---|
| ACID CONDITIONER A | |
| Oxalic Acid | 10.000 |
| Industrial Methylated Spirits | 30.000 |
| Stannic Chloride Pentahydrate | 5.000 |
| Polyethylene Wax Dispersion (40%) | 1.000 |
| Ethoxylated Linear Alcohol (12 moles EO) | 0.200 |
| Tap Water | 53.800 |
| ACID CONDITIONER B | |
| Oxalic Acid | 10.0 |
| Stannic Chloride Pentahydrate | 5.0 |
| Industrial Methylated Spirits (IMS) | 25.0 |
| Dipropylene Glycol Monomethyl Ether | 7.0 |
| Ethoxylated Linear Alcohol (12 EO) | 0.5 |
| Tap Water | 52.5 |
| ACID CONDITIONER C | |
| Stannic Chloride | 5.0 |
| Oxalic Acid | 20.0 |
| IMS | 30.0 |
| Tergitol 15-5-12 | 0.6 |
| Tap Water | 43.9 |
| Lemon Perfume | 0.5 |

EXAMPLE 2

The following ingredients were blended to make crystallizer formulations useful in the practice of the present invention. The solid ingredients were added to water, with agitation, followed by addition of the liquid ingredients.

| INGREDIENTS | AMOUNT (% W/W) |
|---|---|
| CRYSTALLIZER #1 | |
| Zinc Hexafluorosilicate | 10.000 |
| Ammonium Bifluoride | 5.000 |
| Magnesium Citrate Dibasic | 5.000 |
| Oxalic Acid | 3.000 |
| Polyethylene Wax Dispersion (40%) | 3.000 |
| Polysaccharide Gum | 0.400 |
| Deionized Water | 73.600 |
| CRYSTALLIZER #2 | |
| Zinc Hexafluorosilicate | 12.000 |
| Oxalic Acid | 10.000 |
| Industrial Methylated Spirits | 20.000 |
| Calcium Citrate | 7.000 |
| Polyethylene Wax Dispersion (40%) | 1.000 |
| Ethoxylated Linear Alcohol (12 moles EO) | 0.200 |
| Polysaccharide Gum | 0.500 |
| Tap Water | 49.300 |
| CRYSTALLIZER #3 | |
| Oxalic Acid | 3.0 |
| Zinc Hexafluorosililate | 10.0 |
| Ammonium Bifluoride | 5.0 |
| Polyethylene Wax Dispersion (40%) | 8.0 |
| Polysaccharide Gum | 0.4 |
| Deionized Water | 73.6 |

EXAMPLE 3

A 27 year old dark terrazzo tile floor having a surface area of 40 m$^2$ was essentially bare except for emulsion polish build up around the perimeter. The floor was dirty and pitted especially in the heavy traffic areas. The floor was driprimed with Acid Conditioner B of EXAMPLE 1 in 75 minutes by one operator using a heavy (45 kg; 17 inch diameter pad) 400 rpm buffing machine. Dust was swept as it formed. Four (4) black synthetic pads were used and the acid conditioner was center fed by the machine into the center of the pad and onto the floor at a rate of 15–20 ml/m$^2$. Crystallizer #3 of EXAMPLE 2 was then applied over the driprimed floor using the same buffing machine (45 kg; 400 rpm) with a wire wool pad. The crystallizer was center fed at a rate of 10–15 ml/m$^2$. Three (3) wire wool pads were used. The floor was then dry buffed with a tan synthetic pad and swept to remove surplus dust. The crystallizing operation lasted 50 minutes including the dry buffing and sweeping operation.

The edges or perimeter of the floor were hand treated with Acid Conditioner B or CAREFREE brand spray scrub detergent using a green synthetic hand pad. This took 90 minutes to complete.

The dust which formed was a mixture of dirt, wire wool and dry unreacted acid conditioner or crystallizer.

This treated terrazzo floor exhibited a high, uniform durable gloss which was accomplished by a fast, efficient floor treating process.

EXAMPLE 4

A 29 year old black and white terrazzo tile floor having a surface area of 75 m$^2$ was bare and clean with polish build-up around the perimeter and staircases. The floor was driprimed by two operators with Acid Conditioner B of EXAMPLE 1 employing substantially the same procedures and application rate described in Example 3. Seven and one half (7 ½) black synthetic pads were consumed. The floor was dry buffed, swept and dusted to remove excess dust. The dripriming operation lasted 105 minutes.

Crystallizer #3 of EXAMPLE 2 was then applied to the floor by the two operators employing substantially the same procedures and application rate described in Example 3. Six (6) wire wool pads were consumed. The floor was swept, dry buffed with a tan synthetic pad and dust mopped to remove excess dust. The crystallizing operation lasted 180 minutes. The edges were cleaned with CAREFREE spray scrub detergent. The treated floor exhibited a high, uniform durable gloss.

EXAMPLE 5

A 120 year old black and white marble tile floor was bare and clean but heavily scratched with polish build-up around the perimeter. Two operators wet-sanded the floor using a 60 grit carborundum disc and water. The discs were cleaned with water after sanding 5-6 m$^2$. The resulting wet slurry was removed by mopping. One operator driprimed and crystallized the floor employing substantially the same procedures and application rates described in Examples 3 and 4. The edges were cleaned with CAREFREE spray scrub detergent. The treated floor exhibited a high uniform durable gloss.

In similar operations, various acid conditioner compositions and crystallizing agents, described herein, are employed to treat stone floor surfaces, including marble, terrazzo, magnesite, concrete, and granite, whereby a high uniform and durable gloss finish on the stone floor surface is achieved.

What we claim is:

1. An acid conditioning composition for application to a stone surface in the first stage of a two-stage stone surface crystallization process which comprises:
    (a) an acid;
    (b) a surfactant;
    (c) an organic solvent in an amount effective to increase the evaporation rate of the acid conditioning composition;
    (d) water; and
    (e) a stannic chloride compound in an amount of from about 1 to about 10 percent by total weight of the acid conditioning composition, wherein the acid conditioning composition has a pH of from about 0.1 to about 2.0, and wherein the stone surface is a marble or terrazzo stone floor surface, whereby the acid conditioning composition improves the action of a crystalizing agent when applied over the acid conditioning composition.

2. The acid conditioning composition of claim 1 wherein the acid is oxalic acid, citric acid, tartaric acid, a mineral acid or mixtures thereof.

3. The acid conditioning composition of claim 2 wherein the acid is oxalic acid and the oxalic acid is present in an amount of from about 5 to about 20 percent by total weight of the composition.

4. The acid conditioning composition of claim 2 wherein the organic solvent is methanol, ethanol, industrial methylated spirits or mixtures thereof.

5. The acid conditioning composition of claim 4 wherein the organic solvent is industrial methylated spirits and the solvent is present in an amount of from about 10 to about 40 percent by total weight of the composition.

6. The acid conditioning composition of claim 1 wherein the surfactant is an ethoxylated linear alcohol.

7. The acid conditioning composition of claim 1 further comprising a dust absorbing agent.

8. The acid conditioning composition of claim 7 wherein the dust absorbing agent is a glycol ether.

9. The acid conditioning composition of claim 8 wherein the glycol ether is dipropylene glycol monomethyl ether.

10. The acid conditioning composition of claim 7 further comprising a wax.

11. The acid conditioning composiion of claim 7 which comprises the following ingredients by weight percent:

|  | % w/w |
| --- | --- |
| Oxalic Acid | 10.0 |
| Stannic Chloride Pentahydrate | 5.0 |
| Industrial Methylated Spirits | 25.0 |
| Dipropylene Glycol Monomethyl Ether | 7.0 |
| Ethoxylated Linear Alcohol (12 EO) | 0.5 |
| Tap Water | 52.5 |

12. A method of treating a stone surface which comprises:
    (a) applying an acid conditioning composition to the stone surface wherein the acid conditioning composition comprises:
    an acid,
    a surfactant,
    an organic solvent in an amount effective to increase the evaporation rate of the acid conditioning composition,
    water and,
    a stannic chloride compound in an amount of from about 1 to about 10 percent by total weight of the acid conditioning composition,
    wherein the acid conditioning composition has a pH of from about 0.1 to about 2.0;
    (b) allowing the acid conditioning composition to dry on the stone surface; and thereafter
    (c) applying, by buffing, over the acid conditioning composition, an effective amount of an active crystallizing agent,
    whereby a durable, high uniform gloss is produced in situ on the stone surface.

13. The method of claim 12 wherein the acid conditioning composition is applied to the floor with a rotary floor buffing machine.

14. The method of claim 13 wherein the rotary floor buffing machine weighs from about 40 to about 70 kilograms and is fitted with a 15-20 inch diameter floor buffing pad and the acid conditioning composition is center fed into the middle of the floor buffing pad.

15. The method of claim 14 wherein the floor buffing pad is an abrasive synthetic pad.

16. The method of claim 14 wherein the crystallizing agent comprises zinc hexafluorosilicate and the crystallizing agent is buffed onto the floor with a wire wool pad.

17. The method of claim 16 further comprising the step of dry buffing the floor with a tan synthetic pad after the crystallizing agent has been applied to the floor.

18. The method of claim 16 wherein the acid conditioning composition is applied to the floor at a rate of from about 20 to about 40 ml/m$^2$.

19. In a method of producing a microcrystal finish on a stone surface by applying a crystallizing agent containing a source of fluoride ions which react with the stone surface to produce a $CaF_2$ and/or $MgF_2$ microcrystal finish thereon, the improvement which comprises:

(a) employing zinc hexafluorosilicate as the crystallizing agent.

20. The method of claim 19 the stone surface is a marble or terrazzo stone floor surface.

21. In a method of producing a microcrystal finish on a stone surface by applying a crystallizing agent containing a source of fluoride ions which react with the stone surface to produce a $CaF_2$ and $MgF_2$ microcrystal finish thereon, the improvement which comprises:

(a) pretreating the stone surface with an acid conditioning composition have a pH of from about 0.to about 2.0 and comprising:
  from about 5 to about 20 percent by weight of oxalic acid,
  a surfactant,
  an organic solvent in an amount effective to increase the evaporation rate of the acid conditioning composition,
  water and,
  from about 2 to about 10 percent by weight of a stannic chloride compound, based upon the weight of the acid conditioning composition,
  wherein the stone surface is a marble or terrazzo stone floor surface,
(b) allowing the acid conditioning composition to dry on the stone surface; and thereafter
(c) applying, by buffing, over the acid conditioning composition, an effective amount of the crystallizing agent,
whereby the acid conditioning composition improves the action of the crystallizing agent when applied over the acid conditioning composition and a durable, high uniform gloss is produced in situ on the stone surface.

22. The method of claim 21 wherein the stannic chloride compound is stannic chloride pentahydrate.

23. The method of claim 22 wherein the stannic chloride pentahydrate is present in the acid conditioning composition in an amount of about 5 percent by weight.

24. The method of claim 23 wherein the floor is pretreated by mopping the acid conditioning composition onto the floor.

25. The method of claim 23 wherein the floor is pretreated by buffing the acid conditioning composition onto the floor with a rotary floor buffing machine weighing from about 40 to about 70 kilograms and having a 15–20 inch diameter floor buffing pad.

26. The method of claim 25 the acid conditioning composition is center fed into the middle of the floor buffing pad at a rate of from about 20 to about 40 $ml/m^2$.

27. The method of claim 21 wherein the acid conditioning composition comprises the following ingredients by weight percent:

|  | % w/w |
|---|---|
| Oxalic Acid | 10.0 |
| Stannic Chloride Pentahydrate | 5.0 |
| Industrial Methylated Spirits | 25.0 |
| Dipropylene Glycol Monomethyl Ether | 7.0 |
| Ethoxylated Linear Alcohol (12 EO) | 0.5 |
| Tap Water | 52.5 |

28. The method of claim 27 wherein the acid conditioning composition is applied to the floor surface at a rate of from about 10 to about 60 milliliters per square meter area of the floor surface.

29. The method of claim 28 wherein the acid conditioning composition is applied to the floor surface by buffing with a rotary floor buffing machine weighing between about 40 to about 50 kilograms and having a 17 inch diameter floor buffing pad.

30. The method of claim 29 wherein acid conditioning composition is applied at a rate from about 20 to about 40 milliliters per square meter area of the floor surface.

31. A method of treating a stone surface such as marble, terrazzo and the like, comprising:
applying to the stone surface an acid conditioning agent having a pH of about 0.1 to about 2.0 and comprising
  an acid,
  an acid-stable surfactant,
  water, and
  a volatile organic solvent in an amount effective to cause evaporation of the acid conditioning agent; and
applying over the acid conditioning agent an effective amount of a crystallizing agent for providing the stone surface with a durable, uniform, high-gloss film.

32. The method in accordance with claim 31 wherein the acid is oxalic acid, present in an amount of about 5 to about 25 weight percent based on the weight of the acid conditioning agent.

33. The method in accordance with claim 31 wherein the acid-stable surfactant is an alkoxylated linear alcohol.

34. The method in accordance with claim 31 wherein the organic solvent, present in an amount of about 10 to about 40 weight percent based on the weight of the acid conditioning agent, is selected from the group consisting of methanol, ethanol, and mixtures thereof.

35. The method in accordance with claim 31 wherein the crystallizing agent is a hexafluorosilicate salt.

* * * * *

UNITED STATES PATENT AND TRADEMARK OFFICE
CERTIFICATE OF CORRECTION

PATENT NO. : 4,738,876
DATED : April 19, 1988
INVENTOR(S) : Roger D. George, Sampath R. Pasupathikoil, Nigel Stansfeld It is certified that error appears in the above-identified patent and that said Letters Patent is hereby corrected as shown below:

In Column 9, Line 48, the word "crystalizing" should be --crystallizing--.

In Column 10, Line 8, the word "composiion" should be --composition--.

In Column 11, Line 6, after "19" and before "the", please insert the word --wherein--.

In Column 11, Line 15, the word "have" should be --having-- and the number "0." should read --0.1--.

In Column 11, Line 54, after the number "25" and before the word "the", please insert the word --wherein--.

In Column 12, Line 24, after the word "wherein" and before the word "acid", please insert the word --the--.

Signed and Sealed this

Seventh Day of February, 1989

*Attest:*

DONALD J. QUIGG

*Attesting Officer*  *Commissioner of Patents and Trademarks*